(12) United States Patent
Vanwambeke et al.

(10) Patent No.: US 9,150,193 B2
(45) Date of Patent: Oct. 6, 2015

(54) MODE DETECTION SWITCH ASSEMBLY FOR SELF-LOCKING DUAL-MODE SEAT BELT RETRACTOR

(75) Inventors: Bryan M. Vanwambeke, Macomb, MI (US); David Prentkowski, Sterling Heights, MI (US); Thomas Ellington, Lake Orion, MI (US); Daniel K. Webb, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 210 days.

(21) Appl. No.: 13/517,796

(22) Filed: Jun. 14, 2012

(65) Prior Publication Data

US 2013/0334355 A1    Dec. 19, 2013

(51) Int. Cl.
*B60R 22/343* (2006.01)
*B60R 22/36* (2006.01)

(52) U.S. Cl.
CPC ............... *B60R 22/343* (2013.01); *B60R 22/36* (2013.01)

(58) Field of Classification Search
USPC ............. 242/422.2, 383.2, 382, 382.1, 382.2, 242/382.4, 383, 384
See application file for complete search history.

(56) References Cited

U.S. PATENT DOCUMENTS

| | | | |
|---|---|---|---|
| 4,103,842 A * | 8/1978 | Martin et al. ................. | 242/384 |
| 4,811,912 A | 3/1989 | Takada | |
| 5,271,578 A | 12/1993 | Jabusch | |
| 5,553,804 A * | 9/1996 | Hamann ..................... | 242/382.4 |
| 5,831,342 A * | 11/1998 | Vivacqua et al. ............ | 307/10.1 |
| 6,109,556 A * | 8/2000 | Kopetzky et al. .......... | 242/382.2 |
| 6,290,160 B1 * | 9/2001 | Strobel ........................ | 242/383 |
| 6,425,541 B1 * | 7/2002 | Strobel ........................ | 242/371 |
| 6,614,129 B1 | 9/2003 | Mattes | |
| 6,641,077 B2 * | 11/2003 | Hanna et al. ................ | 242/382.2 |
| 7,690,688 B2 | 4/2010 | Clute | |
| 7,992,817 B2 * | 8/2011 | Holbein et al. ............. | 242/382.1 |
| 8,141,806 B2 * | 3/2012 | Odate et al. .................. | 242/384 |
| 8,141,808 B2 * | 3/2012 | Maemura et al. ........... | 242/422.2 |
| 8,579,223 B2 * | 11/2013 | Aranda ........................ | 242/382.2 |
| 8,672,252 B2 * | 3/2014 | Kroger et al. ............... | 242/383.1 |
| 8,727,258 B2 * | 5/2014 | Takamatsu et al. ......... | 242/382.2 |
| 8,818,640 B2 * | 8/2014 | Odate .......................... | 701/45 |
| 2003/0201359 A1 * | 10/2003 | Peter ........................... | 242/390.9 |
| 2004/0065763 A1 * | 4/2004 | Hanna et al. ................. | 242/383 |
| 2007/0095963 A1 * | 5/2007 | Yukinori et al. ............. | 242/374 |
| 2007/0273365 A1 * | 11/2007 | Lanter et al. ................ | 324/207.2 |
| 2007/0295852 A1 * | 12/2007 | Midorikawa ............... | 242/390.9 |
| 2008/0017744 A1 * | 1/2008 | Odate .......................... | 242/382.2 |

(Continued)

FOREIGN PATENT DOCUMENTS

DE    44 17 064 A1    7/1995

*Primary Examiner* — Emmanuel M Marcelo
*Assistant Examiner* — Justin Stefanon
(74) *Attorney, Agent, or Firm* — Brinks Gilson & Lione

(57) ABSTRACT

A dual-mode retractor for an automotive seat belt webbing is configured to switch between a first mode and a second mode, the first mode being one of an ELR mode and an ALR mode, and the second mode being the other one of the ELR mode and the ALR mode. The retractor switches between the first mode and the second mode via a relative movement between a first part and a second part of the retractor. The magnetic field of a permanent magnet mounted on the first part is picked up by a Hall effect sensor. An interrupter plate is mounted on the second part in a position relative to the magnet, in which the interrupter plate, in which the interrupter plate exposes the HED to the original magnetic field in the first mode and to a modified magnetic field in the second mode.

8 Claims, 3 Drawing Sheets

(56) References Cited

U.S. PATENT DOCUMENTS

| | | | |
|---|---|---|---|
| 2011/0163194 A1* | 7/2011 | Aranda et al. | 242/383.1 |
| 2011/0278905 A1* | 11/2011 | Ikeda | 297/475 |
| 2013/0073148 A1* | 3/2013 | Dolan et al. | 701/45 |
| 2014/0028075 A1* | 1/2014 | Kohlndorfer et al. | 297/475 |

* cited by examiner

MODE DETECTION SWITCH ASSEMBLY FOR SELF-LOCKING DUAL-MODE SEAT BELT RETRACTOR

TECHNICAL FIELD

The invention relates to a mode detection switch for a dual-mode self-locking automotive seat belt retractor operable both as an emergency locking retractor (ELR) and as an automatic locking retractor (ALR), where the seat belt retractor is part of a motor vehicle passive safety system comprising an additional associated restraint device, such as an inflatable airbag.

BACKGROUND

Motor vehicle seat belt retractors are usually one of three types, ALR, ELR, or dual-mode. An ALR includes a self-locking mechanism operating like a ratchet while a seat belt tongue is engaged with a seat belt buckle. The seat belt webbing is automatically tightened, while the ALR prevents extraction of the available belt webbing. The ALR racheting operation is cancelled when the webbing is fully retracted. An ELR includes a locking mechanism that is activated by vehicle acceleration (vehicle sensitive), webbing acceleration (webbing sensitive), or other crash sensing means to block webbing extension. Absent an activation of the ALR, seat belt webbing can be pulled out to lengthen the available seat belt webbing. Both an ALR and an ELR are configured to restrain a passenger during a frontal impact or vehicle rollover. A dual-mode retractor combines an ELR and an ALR, and a vehicle occupant chooses the desired mode. Typically, a dual-mode retractor is switched to the ALR mode by completely or nearly completely pulling out the seat belt webbing. The ELR can be converted to an ALR at the option of a vehicle occupant. While the ELR mode provides a comfortable adjustment for an occupant seated on a vehicle seat, infant carriers may be more safely secured in the ALR mode. An ALR has the advantage that is very easily used with child restraint systems, since the belt can be fastened and cinched down to secure the child restraint. However, an ELR is more acceptable for ordinary use since it provides enhanced comfort and convenience for the vehicle occupant. Dual-mode systems accommodate use with both child restraint systems and normal operation.

In a safety system that comprises at least one further restraint device, such as an airbag or a load limiter for the seat belt webbing, the currently selected mode of a dual-mode retractor constitutes a valuable piece of information for the operation of the additional restraint device. For example, it is generally not preferred to activate a frontal impact airbag for a seating position being used for securing a child restraint device.

Accordingly, some vehicle manufacturers are looking to verify the currently selected mode, i.e. ALR or ELR, so they can use this information to provide as an input to an electronic control unit (ECU) for controlling certain restraint system functions. Some current retractors use microswitches or simple contact switches as part of a detection circuit to comply with the seat belt use indicator requirement in FMVSS 408. These are simple switches and may not provide the proper information for use in a restraint system control algorithm included in an ECU.

SUMMARY

It is an objective of the present invention to provide a dual-mode retractor assembly capable of transmitting reliable information to an ECU on the currently selected mode of the dual-mode retractor.

According to the present invention, a dual-mode retractor for automotive seat belt webbing is configured to switch between an ELR mode and an ALR mode via a relative movement between a first part and a second part of the retractor. A permanent magnet mounted on the first part cooperates with a Hall Effect device (HED) positioned to detect the magnetic field. An interrupter plate is mounted on the second part in a position relative to the magnet, in which the interrupter plate allows the magnetic field to be detected by the Hall Effect sensor in the first mode and forms a shield between the magnet and the Hall Effect sensor in the second mode. The HED has the benefit over inductive sensors that it is an active sensor having its own power supply through electrical conduits. Accordingly, the HED is capable of detecting positions, not only movements that induce a change in magnetic flux.

Further details and benefits of the present invention become evident from the following description of the attached drawings illustrating a preferred embodiment.

BRIEF DESCRIPTION OF THE DRAWINGS

The accompanying drawings are included for illustrative purposes only and are not intended to limit the scope of the invention.

DETAILED DESCRIPTION

Figure 1:
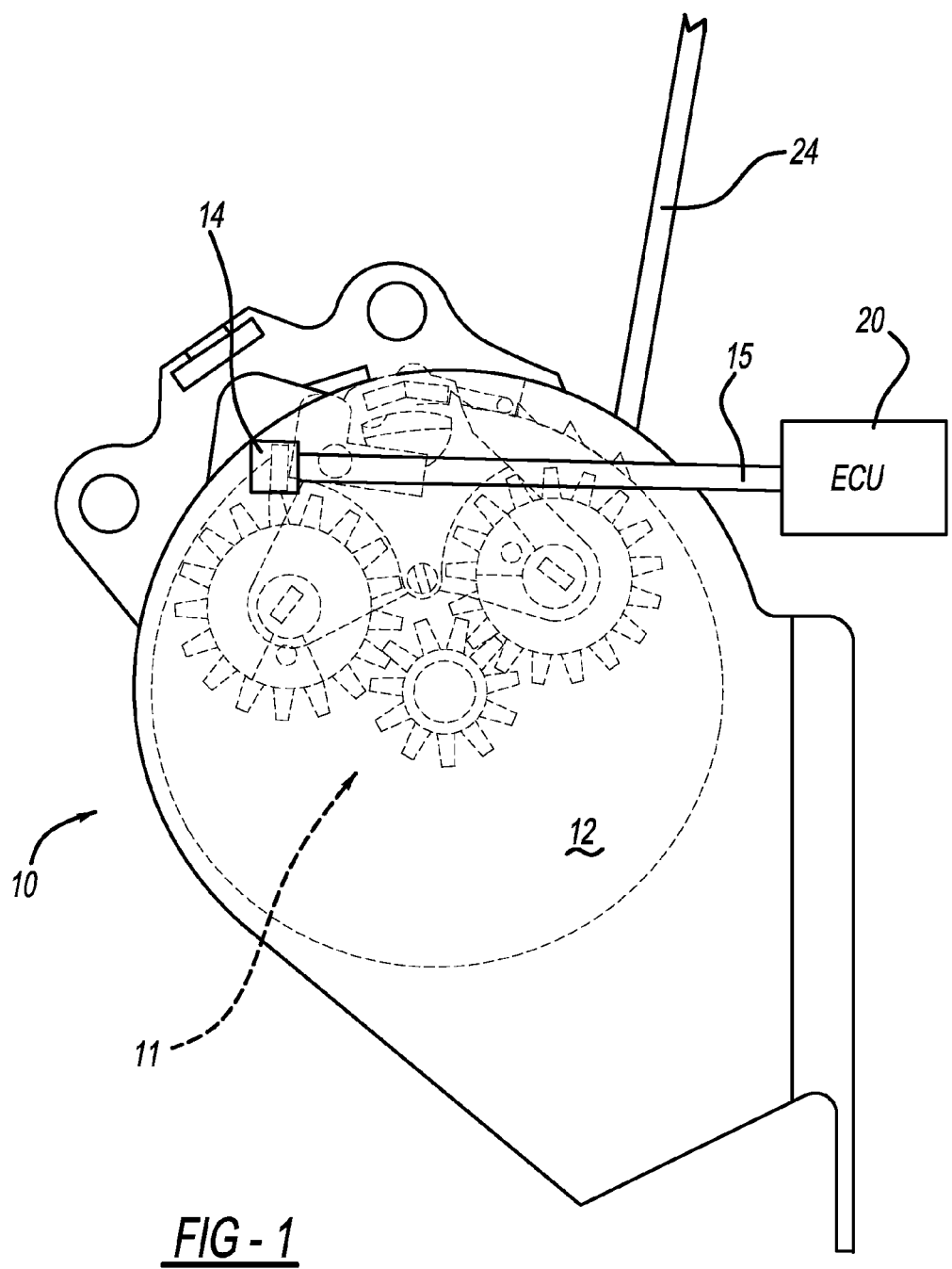
FIG. 1 shows an axial side view of a dual-mode retractor according to one embodiment the present invention.
Figure 2:
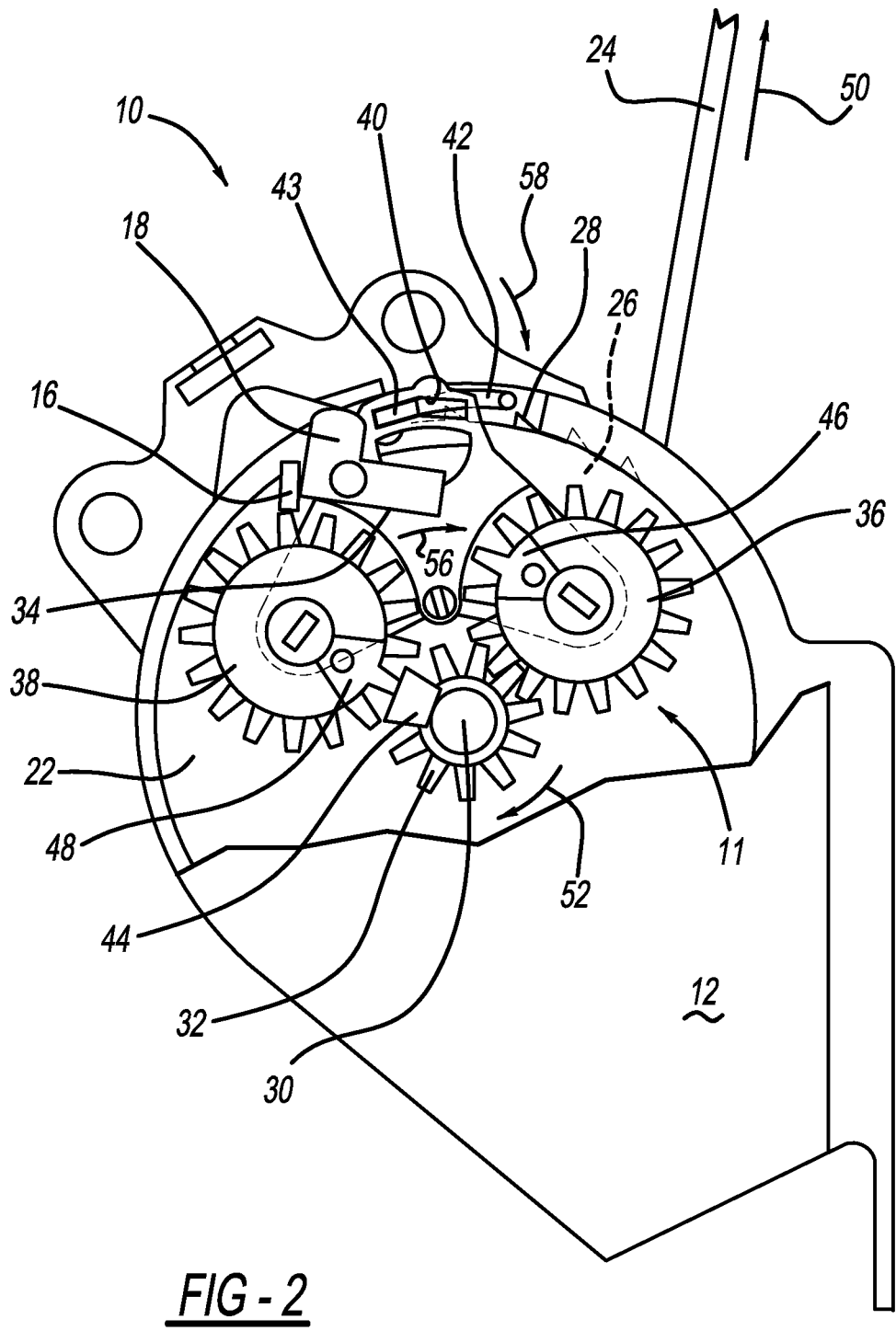
FIG. 2 shows an axial side view of the dual-mode retractor of FIG. 1 operating in the ELR mode, with a partially removed cover.
Figure 3:
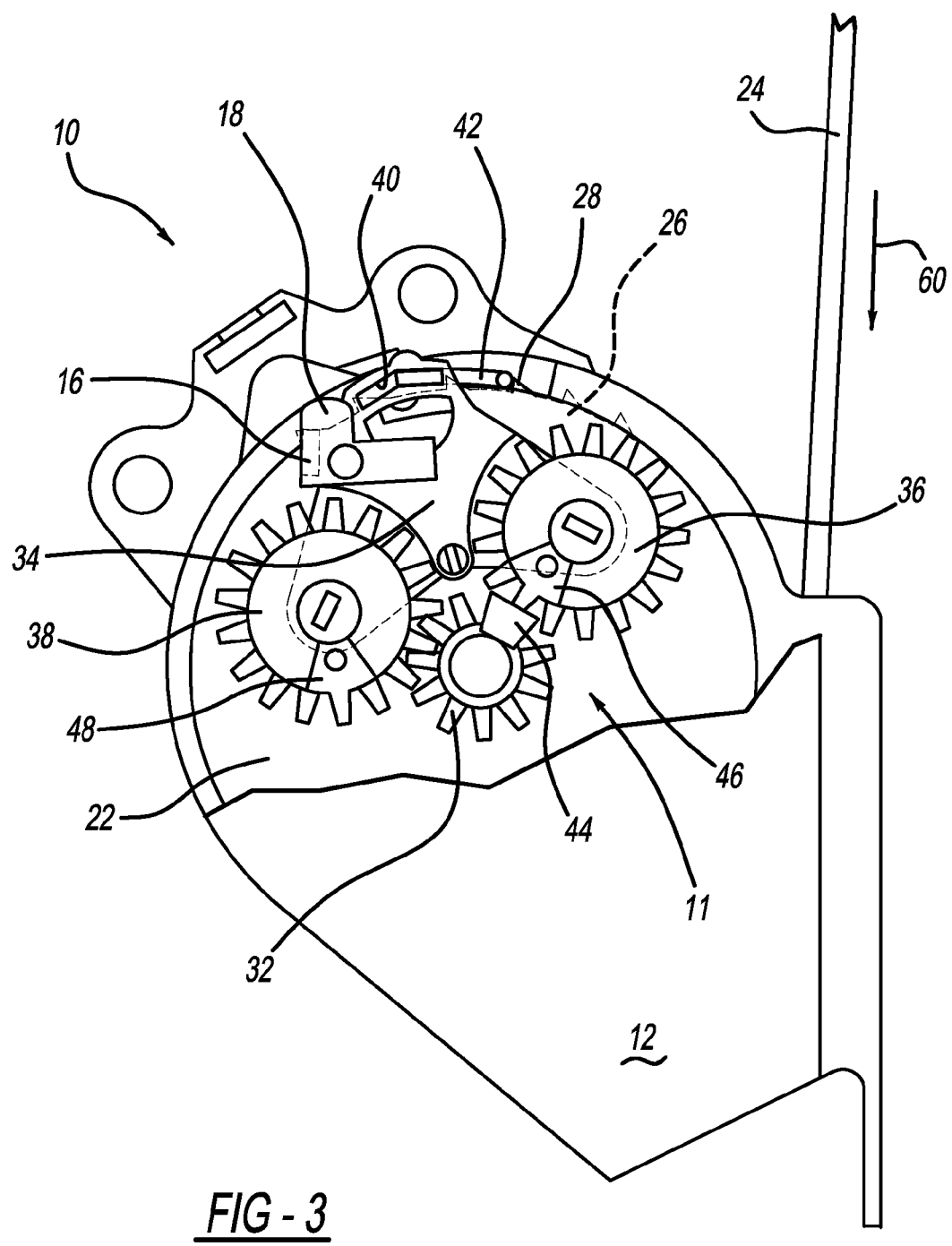
FIG. 3 shows an axial side view of the dual-mode retractor of FIG. 1 operating in the ALR mode, with a partially removed cover.

FIGS. 1 through 3 show an axial view onto a self-locking retractor 10 for a seat belt. FIG. 1 shows the retractor 10 in a fully assembled state, while FIGS. 2 and 3 show the retractor 10 without an outer cover 12.

Referring to FIG. 1, the outer cover 12 covers a switching mechanism 11 for switching the retractor between an automatic locking retractor mode (ALR mode) and an emergency locking retractor mode (ELR mode). The switching mechanism 11 will be explained in more detail in connection with the subsequent figures.

A Hall Effect device (HED) 14 is mounted on the cover 12 in a position opposite a magnet 16 located underneath the cover 12. The HED 14 is connected to an electronic control unit (ECU) 20 via electric conduits 15.

Referring now to FIGS. 2 and 3, the switching mechanism 11 is mounted on a base plate 22 forming a leg of a U-shaped housing in which a spool shaft 30 with a spool, not represented in the drawing, with the seat belt 24 wound on the spool is rotatably supported. A winding spring, not represented in the drawing, is also provided at the housing of the self-locking retractor 10. The winding spring acts on the spool shaft 30 for winding the seat belt webbing 24. At the other leg of the U-shaped housing, a blocking mechanism is located.

The spool shaft 30 extends through the base plate 22 for supporting, in a form-locking manner, a gear wheel 32 so that a fixed connection of the gear wheel 32 with the spool shaft 30 results. A rocker arm 34 is pivotably connected to the base plate 22 of the housing of the retractor and is provided with gear wheels 36 and 38 at both outer ends. The pivoting arrangement is designed such that the gear wheels 36 and 38 are constantly meshing with the gear wheel 32 fixedly connected to the spool shaft 30. The gear wheels 32, 36, and 38 are configured to mesh at all times, even during a movement of the rocker arm 34.

A chevron-shaped guide slot 40 is arranged at a radially outer portion of the rocker arm 34. The chevron-shaped guide slot 40 performs a circumferential movement when the rocker arm 34 pivots in direction 56 (FIG. 2) or 66 (FIG. 3). A spring arm 42 is supported at the base plate 22 of the housing of the retractor 10 which, due to a spring bias, is urged in the direction of engagement with the outer teeth 28 of the control disk 26, as represented in FIG. 3. An elongated tab 43 formed on the spring arm 42 is held by the left half of the chevron-shaped guide slot 40 of the rocker arm 34 at such an angular position that, during normal operation of the retractor 10, the spring arm 42 is radially removed from engagement with the outer teeth 28 of the control disk 26.

The permanent magnet 16 is fixedly attached to the base plate 22 adjacent to an interrupter plate 18 fixedly mounted on the rocker arm 34. The interrupter plate 18 is made of ferromagnetic material forming a magnetic shield and operates as a vane interrupter as will be explained in more detail below. The ferromagnetic material may be steel or any other material functioning as a magnetic shield. Interrupter plate 18 may act to shield and magnetic field from its influence on HED 14, or change the direction or magnitude of the magnetic flux lines which interact with the HED. HED 14 produces an electrical output in response to a changed magnetic field.

The meshing gear wheels 32, 36, and 38 are provided with switching lugs 44, 46, and 48 in a plane outside of the plane of the gear teeth. The gear wheel 32 carries switching lug 44, the gear wheel 36 switching lug 46, and the gear wheel 38 carries switching lug 48.

Based on the position shown in FIG. 2, the operation of the locking device will be described in the following.

In the position represented in FIG. 2, the self-locking retractor 10 functions as ELR with a vehicle-sensitive and belt-sensitive control of its blocking mechanism via control of the control disk 26. In the position shown in FIG. 2, the magnet 16 generates a magnetic field that permeates the cover 12 and is picked up by the HED 14 attached to the cover 12. The HED transmits the respective information to the ECU 20 that determines that the retractor 10 is in the ELR mode.

When, for example, for attaching a child seat, the seat belt 24 is removed from the spool in the direction of arrow 50, the gear wheel 32 that is fixedly connected to the spool shaft 30 is rotated in the direction of arrow 52 whereby a load-free actuation of the gear wheels 36 and 38 in the direction of rotation of arrow 54 occurs. During this rotation of the gear wheels 32, 36, and 38 the corresponding switching lugs 44, 46, and 48 do not come into contact but are rotated past one another.

Only when a predetermined number of revolutions of the gear wheel 32 has been reached which corresponds to the predetermined unwinding state of the seat belt 24, the switching lugs 44 and 46 of the gear wheels 32 and 36 abut one another such that upon a further loading of the gear wheel 32 in the direction of rotation 52 the rocker arm 34 is pivoted in the direction of arrow 56. Due to this pivoting, the chevron-shaped guide slot 40 guides the tab 43 of the spring arm 42 into the right half of the chevron-shaped guide slot 40 so that, due to its spring action and the angular position of the tab 43, the spring arm 42 is introduced in the direction of arrow 58 into the outer teeth 28 of the control disk 26.

For example, the shown embodiment provides ten teeth on gear wheel 32 and 17 teeth on each of gear wheels 36 and 38. Accordingly, the switching lug 44 on gear wheel 32 will mesh with each of the switching lugs 46 and 48 on gear wheels 36 and 38, respectively, every 17 revolutions of the gear wheel 32, corresponding to ten revolutions of the gear wheels 36 and 38.

In this position, represented in FIG. 3, the control disk 26 is locked against further rotation of the spool shaft 30 in the direction of removal 50, while it may rotate in the direction of winding up the seat belt (arrow 60). Accordingly, in the position represented in FIG. 3, the seat belt 24 may be wound onto the spool of the retractor 10 while even a slight removal of the seat belt 24 results in a blockage of this removable movement. Accordingly, the retractor 10 is in the ALR mode. The rocker arm 34 is not biased by a spring and remains in its respective position until a pair of switching lugs, consisting of switching lugs 44 and 46 or of switching lugs 44 and 48, engages.

In the position shown in FIG. 3, the interrupter plate 18 covers the magnet 16 so that the magnetic field of the magnet 16 does not reach the HED 14 mounted on the cover 12. The HED 14 transmits the respective information to the ECU 20 that determines that the retractor 10 is in the ALR mode.

As is evident from the described function of the HED 14, it is sufficient that the HED 14 operates as a digital switch that distinguishes between the two modes, ALR and ELR. The HED 14 has the benefit over inductive sensors that it is an active sensor having its own power supply through conduits 15. Accordingly, the information sent by the HED 14 is capable of detecting positions, not only movements that induce a change in magnetic flux.

When it is desired to release the constant activation of the locking mechanism during the subsequent winding of the seat belt 24, the gear wheel 32 with the switching lug 46, after rotating in the direction of arrow 62 for a predetermined number of revolutions, abuts the switching lug 48 of the gear wheel 38 which, during the winding movement of the seat belt 24 in direction of arrow 60, is rotated in the direction of arrow 64. In this position a further rotation of the gear wheel 32 results in a pivoting of the rocker arm 34 in direction of arrow 66. The chevron-shaped guide slot 40 moves in the same direction. As a result, the spring arm 42 is guided by the left half of the chevron-shaped guide slot 40 so that the spring arm 42 is lifted in the direction of arrow 68 away from the outer teeth 28 of the control disk 26. After completion of this movement, the switching position corresponds to the representation of FIG. 2 again, in which a normal function of the vehicle-sensitive and the belt-sensitive control system of the retractor 10 is ensured.

As the magnet 16 is no longer covered by the interrupter plate 18, the HED 14 picks up the magnetic field again and sends information to the ECU 20 that represents the ELR mode.

The present invention has the advantage of providing a highly reliable mode detection in a small integrated package size with a small number of additional components. A malfunction of the HED switch can be easily diagnosed, and the output of the HED can be directly processed in an ECU.

While the embodiment depicted in FIGS. 1 through 3 operates with the chevron-shaped slot 40 engaging and disengaging the spring arm 42, the invention is applicable to any dual-mode retractors that switch between the ELR mode and the ALR mode via a relative movement between two parts. The magnet 16 and the interrupter plate 18 can be mounted on any two parts of such a dual-mode retractor that move relative to each other during the switching operation. The interrupter plate 18 can be arranged relative to the magnet 16 in a position, in which the interrupter plate 18 covers the magnet in one of the two modes, ELR and ALR, and leaves the magnet 16 uncovered in the other one of the two modes.

Furthermore, the magnet 16 and the HED 14 may be combined into a subassembly that can be mounted to the cover 12 or to the base plate 22 as one unit. This may simplify the manufacturing process and provide better control of the air gap between the magnet and the HED 14.

The foregoing description of an embodiment of the invention has been presented for purposes of illustration and description. It is not intended to be exhaustive or to limit the invention to the precise embodiment disclosed. Numerous modifications or variations are possible in light of the above teachings. The embodiment discussed was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A dual-mode retractor for an automotive seat belt webbing, the retractor being configured to switch between a first mode and a second mode, the first mode being one of an ELR mode and an ALR mode, and the second mode being the other one of the ELR mode and the ALR mode, the retractor switching between the first mode and the second mode via a relative movement between a first part and a second part of the retractor, the retractor further comprising:
    a permanent magnet mounted on the first part, the permanent magnet emitting an original magnetic field;
    a Hall effect device positioned to detect the magnetic field, the Hall effect device being in a fixed position relative to the permanent magnet; and
    an interrupter plate mounted on the second part and movable between a first position relative to the permanent magnet, in which the interrupter plate exposes the Hall effect device to the original magnetic field in the first mode, and a second position relative to the permanent magnet, in which the interrupter plate exposes the Hall effect device to a modified magnetic field in the second mode, wherein the interrupter plate is a pivotably mounted vane interrupter.

2. The dual-mode retractor of claim 1, wherein the modified magnetic field has a magnetic flux opposite to the original magnetic field.

3. The dual-mode retractor of claim 1, wherein the modified magnetic field has a magnetic flux perpendicular to the original magnetic field.

4. The dual-mode retractor of claim 1, further comprising a plastic cover, on which the Hall effect device is fixedly mounted.

5. The dual-mode retractor of claim 1, wherein the first part is a base plate and the second part is a rocker arm making a swivel movement relative to the base plate when the retractor switches between the first mode and the second mode.

6. The dual-mode retractor of claim 1, wherein the first mode is the ELR mode and the second mode is the ALR mode.

7. The dual-mode retractor of claim 1, wherein the Hall effect device is configured as a digital switch.

8. The dual-mode retractor of claim 1, wherein in the second mode the interrupter plate extends between the Hall effect device and the permanent magnet.

* * * * *